United States Patent
Schulz et al.

(10) Patent No.: US 12,140,914 B2
(45) Date of Patent: Nov. 12, 2024

(54) METHOD FOR THE CLOSED-LOOP CONTROL OF A CHEMICAL PROCESS IN AN INDUSTRIAL-SCALE CHEMICAL INSTALLATION

(71) Applicants: THYSSENKRUPP INDUSTRIAL SOLUTIONS AG, Essen (DE); thyssenkrupp AG, Essen (DE)

(72) Inventors: Marcel Schulz, Bochum (DE); Dirk Scheckreiter, Schwerte (DE)

(73) Assignees: THYSSENKRUPP INDUSTRIAL SOLUTIONS AG, Essen (DE); thyssenkrupp AG, Essen (DE)

( * ) Notice: Subject to any disclaimer, the term of this patent is extended or adjusted under 35 U.S.C. 154(b) by 610 days.

(21) Appl. No.: 17/272,017

(22) PCT Filed: Sep. 19, 2019

(86) PCT No.: PCT/EP2019/075193
§ 371 (c)(1),
(2) Date: Feb. 26, 2021

(87) PCT Pub. No.: WO2020/064506
PCT Pub. Date: Apr. 2, 2020

(65) Prior Publication Data
US 2021/0286347 A1    Sep. 16, 2021

(30) Foreign Application Priority Data
Sep. 26, 2018   (DE) .................... 10 2018 123 792.8

(51) Int. Cl.
*G05B 13/04*    (2006.01)
*G05B 19/418*   (2006.01)
(Continued)

(52) U.S. Cl.
CPC ....... *G05B 13/04* (2013.01); *G05B 19/41865* (2013.01); *G06F 18/214* (2023.01); *G06N 20/00* (2019.01); *H04W 4/80* (2018.02)

(58) Field of Classification Search
None
See application file for complete search history.

(56) References Cited

U.S. PATENT DOCUMENTS

| 2006/0277094 A1* | 12/2006 | Kirsch | G06Q 10/0639 |
| | | | 705/7.38 |
| 2007/0129917 A1 | 6/2007 | Blevins et al. | |
| 2017/0129917 A1 | 5/2017 | Bandi | |

FOREIGN PATENT DOCUMENTS

| DE | 10 2013 100 698 A | 7/2013 |
| EP | 1 731 981 A | 12/2006 |

OTHER PUBLICATIONS

English Translation of International Search Report issued in PCT/EP2019/075193, dated Dec. 4, 2019.
(Continued)

*Primary Examiner* — Sean Shechtman
(74) *Attorney, Agent, or Firm* — hyssenkrupp North America, LLC

(57) ABSTRACT

A method for closed-loop control of a chemical process may involve acquiring process data with sensors, transferring the process data to a control system via a fieldbus, transferring a subset of the process data to a computer system that includes a simulation program for stationary and dynamic process simulation of the chemical process, a closed-loop control program for implementing a closed-loop controller, and a memory for storing simulated state variables, cyclically repeatedly calculating and storing the simulated state variables of the chemical process by the simulation program from the subset of the process data, transferring a setpoint value of a control variable of the chemical process to the
(Continued)

closed-loop control program, reading a subset of the simulated state variables for input into the closed-loop control program, ascertaining a manipulated variable to achieve the setpoint value by the closed-loop control program, and transferring the calculated manipulated variable to the control system.

10 Claims, 2 Drawing Sheets

(51) Int. Cl.
*G06F 18/214* (2023.01)
*G06N 20/00* (2019.01)
*H04W 4/80* (2018.01)

(56) References Cited

OTHER PUBLICATIONS

Goodfellow et al., Deep Learning, The MIT Press, 2017, ISBN 9780262035613.

* cited by examiner

METHOD FOR THE CLOSED-LOOP CONTROL OF A CHEMICAL PROCESS IN AN INDUSTRIAL-SCALE CHEMICAL INSTALLATION

CROSS REFERENCE TO RELATED APPLICATIONS

This application is a U.S. National Stage Entry of International Patent Application Serial Number PCT/EP2019/075193, filed Sep. 19, 2019, which claims priority to German Patent Application No. DE 10 2018 123 792.8, filed Sep. 26, 2018, the entire contents of both of which are incorporated herein by reference.

FIELD

The present disclosure generally relates to systems and methods for closed-loop control of chemical processes in industrial-scale chemical installations, as well as to chemical installations with such systems.

BACKGROUND

A constant concern in the prior art is to equip industrial-scale chemical installations with an extended process control system (Advanced Process Control System) or to retrofit existing installations in order to optimize operation of the installation while taking all safety regulations into account. In particular in the case of chemical production installations with complex structures that can comprise a multiplicity of subsystems (often several hundred), the aim is to improve the control, transparency, maintenance and performance, so that production is achieved in accordance with predefined setpoint values and, at the same time, a failure of the chemical production installation, which is usually associated with significant costs, can be avoided.

Thus, a need exists for improved operation of an industrial-scale chemical installation.

DETAILED DESCRIPTION

Figure 1:
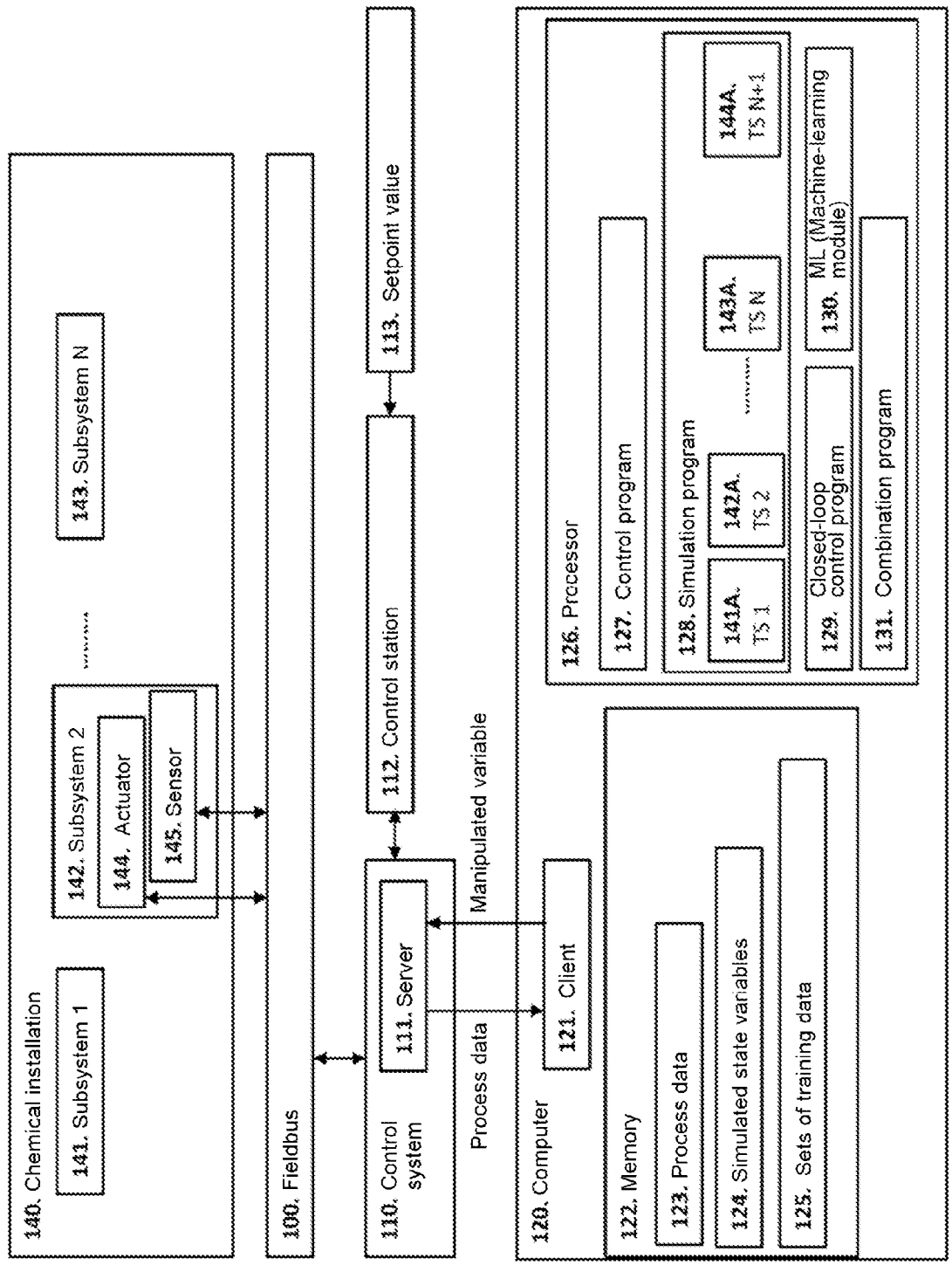
FIG. 1 is a schematic view of an example chemical installation with a system for the closed-loop control of a chemical process carried out in an industrial-scale chemical installation.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A Methods for the closed-loop control of a chemical process in an industrial-scale chemical installation are proposed. The industrial-scale chemical installation that is to be controlled can be a production installation, in particular a chemical production installation. The installation can be constructed from a multiplicity of subsystems (e.g. 5-10 or more). A subsystem is in particular characterized in that it can consist of an assembly capable of independent function, the function of which preferably has a direct influence on the production or on the production flow. The installation that is to be controlled can, for example, be an installation for the manufacture of sulfuric acid, coke, polymers, fertilizers, synthesis gas, cement, urea, ammonium nitrate or an installation for water desalination.

The method comprises the following steps:
acquisition of process data of the chemical installation by sensors,
transfer of the process data to a control system via a fieldbus,
transfer of at least a subset of the process data from the control system to a computer system, wherein the computer system comprises a simulation program for stationary and/or dynamic process simulation of the chemical process, a closed-loop control program for the implementation of a closed-loop controller for the chemical process, and a memory for storing simulated state variables,
cyclically repeated calculation of the simulated state variables of the chemical process by the simulation program from the subset of the process data and storage of the simulated state variables in the memory,
transfer of at least one setpoint value of a control variable of the chemical process to the closed-loop control program,
reading at least a subset of the simulated state variables from the memory for input into the closed-loop control program,
ascertainment of a manipulated variable to achieve the setpoint value by the closed-loop control program through processing the simulated state variables that have been read from the memory, and
transfer of the calculated manipulated variable to the control system.

A "simulated state variable" refers here to a state variable of the chemical installation, such as for example a parameter value, that is truly present at the time of the simulation but for which a value acquired by a sensor is not present, for example because a sensor has failed, or because there is no sensor present for this purpose.

A dynamic process simulation for the ascertainment of state variables by simulating the ongoing installation operation, wherein the ascertained state variables are applicable for the control of the operation of the installation in real time, is advantageously achieved through the above-mentioned method steps.

The acquisition of real process data of the chemical installation is performed by sensors that are designed to measure at least one parameter value or process data or state variables that relates to the installation. The process data acquired by the sensors are transferred to a control system via a fieldbus. The control system has the purpose of representing a complex planned and actual process relating to time and material content in a clear manner, and to support or enable human controlling manipulation.

The use of a fieldbus to transfer the process data acquired by the sensors is advantageous, since the fieldbus replaces the bundle of parallel cables between the individual sensors and the control system by a single bus cable. Fieldbuses that can be employed for the chemical installation are in particular selected from the group consisting of Ethernet Powerlink, EtherNet/IP, CANopen, ARCNET, AS-Interface, EtherCAT and PROFIBUS. At least a subset of the process data acquired by the sensors is transferred from the control system to a computer system, wherein the computer system comprises a simulation program for stationary and/or dynamic process simulation of the chemical process, a closed-loop control program for the implementation of a closed-loop controller for the chemical process, and a memory for storing simulated state variables. The closed-loop controller that is implemented by the closed-loop control program can, for example, be a standard closed-loop controller with P, PI, PD and PID behavior. A discontinuous controller such as, for example, a two-point controller, multi-point controller and a fuzzy controller can be implemented for better dynamic behavior of the process variable. Since the chemical installation can comprise a more complex control installation with non-linear control paths or multiple, mutually interlinked process variables and manipulated variables, it is also conceivable that a modified controller is implemented by the closed-loop control program such as, for example, a digital controller for meshed controllers, multi-variable controllers, controllers in state space or model-based controllers.

Cyclically repeated calculation of the simulated state variables of the chemical process by the simulation program from the subset of the process data and storage of the simulated state variables in the memory, for example the working memory, takes place in the computer system. At least one setpoint value of a control variable of the chemical process is also transferred to the closed-loop control program, wherein the at least one setpoint value is entered manually by a user, by the control system, or by calling up stored tables or values from databases, wherein a plurality of setpoint values can, of course, be specified for a chemical installation. Furthermore, in the closed-loop control program, at least a subset of the simulated state variables stored in the computer system are read in for input into the closed-loop control program, so that accordingly at least one manipulated variable for achieving the setpoint value is ascertained by the closed-loop control program through processing the simulated state variables that have been read from the memory. The calculated manipulated variable is transferred to the control system. The ascertained manipulated variable can be transferred by the control system to an actuator in the chemical installation via a fieldbus, wherein the fieldbus can be the same fieldbus as described above.

According to a first exemplary embodiment of the method according to the invention, the control system can contain a server and the computer system can contain a client, wherein the server and the client are configured in such a way that the client can perform read access to the server, so that the subset of process data is transferred from the server to the client, and that the client can perform write access to the server in order to transfer the calculated manipulated variable to the control system.

An interface between a computer and the control system via which data can be exchanged without the real-time capability of the control system being impaired arises advantageously through the use of a client-server solution. A further advantage of the client-server solution is that the coupling of the or of a computer system to the control system of the chemical installation can be performed independently of the physical location. A higher level of access security is furthermore advantageously achieved through the client-server solution, since the client must be authenticated at the server before accessing special data. The addition and disconnection of clients without the operation of the chemical installation being impaired is also possible.

For this exemplary embodiment of the method according to the invention, it can furthermore advantageously be provided that the server of the control system is an OPC server, and that the client of the computer system is an OPC client. OPC can advantageously be employed for real-time data (monitoring), data archiving, alarm signaling as well as directly for control (command transmission). The use of an OPC client and an OPC server, preferably using the OPC Unified Architecture (OPC UA) specification is particularly interesting, since a COM interface is not described, but rather a WSDL (Web Services Description Language), which can be converted according to COM and in a variety of web service protocols, whereby portability is ensured. A further advantage of the OPC Unified Architecture (OPC UA) specification is that in general both the scalability and the security are improved.

It can furthermore be provided that the client is designed as the master and the server as the slave.

In the case of the embodiment in which the control system contains a server and the computer system contains a client, wherein the client can be designed as the master and the server as the slave, it can furthermore be provided that the control system has a computer interface for connection of the computer system, via which a direct communication connection between the control system and the computer system is established, and at least the transfer of the subset of process data and the transfer of the manipulated variable takes place via the direct communication connection.

The computer interface for connection of the computer system, via which a direct communication connection is established between the control system and the computer system, can, for example, be realized by a standard computer interface, for example USB, Ethernet, WLAN, LAN, Bluetooth or other known interfaces. In the light of security considerations it can be provided that the computer interface comprises a cable, or is a (point-to-point) cable connection, or is a wireless interface, wherein the latter can comprise a near field communication (NFC) system or can be encrypted.

One embodiment of the method according to the invention furthermore provides that the manipulated variable is transferred from the control system via the fieldbus to an actuator.

As a result of this embodiment, the actuator can manipulate the control path in a targeted manner.

A further embodiment of the method furthermore provides that the computer system contains a machine-learning module, wherein sets of training data that contain at least the subset of the simulated state variables, and the manipulated variables calculated from them by the closed-loop control program, are used to train the machine-learning module.

Machine-learning is known from the prior art; see, for example, GOODFELLOW et al., Deep Learning, The MIT Press, 2017, ISBN 9780262035613.

The sets of training data for training the machine-learning module can here contain the response of the chemical installation to the manipulated variable that is contained in the process data.

One embodiment of the method provides for switching from the closed-loop control program to the machine-learning module after the machine-learning module has been trained, so that said program is replaced by the machine-learning module, and so that the manipulated variable is ascertained by the machine-learning module from the state variables that have been read.

With this embodiment, the closed-loop control program and/or the control station can be dispensed with for a shorter or longer period after the machine-learning module has been trained. This embodiment is particularly interesting for the commissioning of a chemical installation. The machine-learning module can, for example, be trained in an existing installation. Because it is, for example, installed on a portable computer system, as soon the machine-learning module has completed all of the necessary training runs, it can easily be connected to the control system of the chemical installation that is to be commissioned and can control or regulate it. The decision as to when the machine-learning module has completed all of the necessary training runs can, for example, be specified by means of a confidence value of the machine-learning module, wherein this confidence value is greater than a previously specified threshold value. In other words, when the machine-learning module can give a prediction with a confidence value that is greater than the threshold value, then the training is complete and/or the machine-learning module can be employed instead of or in addition to the closed-loop control program for the control of the installation.

As an alternative to the above-mentioned embodiment, it can be provided that, after the machine-learning module has been trained, the subset of the simulated state variables is also entered into the machine-learning module in order to ascertain a machine-learning manipulated variable and, with the further step that the machine-learning manipulated variable and the manipulated variable ascertained by the closed-loop control program are combined with one another, for example taking the average or a weighted mean value in order to ascertain a resultant manipulated variable, wherein the resultant manipulated variable is transferred to the control system.

Through this alternative embodiment of the method according to the invention, it can advantageously be ensured, through the combination of the machine-learning manipulated variable (SML) and the manipulated variable (SR) ascertained by the closed-loop control program, that inaccuracies in the ascertainment of the manipulated variable (S) on the part of the closed-loop control program or of the machine-learning module can be compensated for.

According to a further form of embodiment, it is provided that the machine-learning module calculates a confidence (K; where $0 \leq K \leq 1$) for the ascertainment of the manipulated variable, and the combined manipulated variable is ascertained in a weighted manner, taking the respective confidences into consideration. The weighting of the result for the manipulated variable from the machine-learning module can, for example, be proportional to or identical to the confidence value with which the machine-learning module has ascertained the result. The manipulated variable (S) can thus be a combination of the manipulated variable ($S_R$) ascertained by the closed-loop control program and the machine-learning manipulated variable ($S_{ML}$). The manipulated variable (S) can furthermore be a linear combination of the manipulated variable (SR) ascertained by the closed-loop control program and the machine-learning manipulated variable ($S_{ML}$) (which can be represented mathematically as $S = \alpha \cdot S_R + \beta \cdot S_{ML}$; where $\alpha + \beta = 1$). The manipulated variable can equally also be ascertained in a weighted manner, taking the respective confidences into consideration (which can be represented mathematically as $S = (1-K) \cdot S_R + K \cdot S_{ML}$).

It may, furthermore, be provided for both alternative embodiments that the machine-learning module is trained with further sets of training data that are generated from the further operation of the chemical installation by the controller by means of the machine-learning module.

According to a further aspect, a system for the closed-loop control of a chemical process carried out in an industrial-scale chemical installation is proposed. The system is designed here to carry out the previously described method.

According to a further aspect, a chemical installation with a system for the closed-loop control of a chemical process carried out in an industrial-scale chemical installation is proposed. The system for the closed-loop control of a chemical process carried out in an industrial-scale chemical installation is here the previously described system that is designed to carry out the previously described method.

One embodiment of the invention provides that the chemical installation is an installation for the manufacture of sulfuric acid, coke, polymers, fertilizers, synthesis gas, cement, urea, ammonium nitrate or for water desalination.

FIG. 1 shows a schematic view of an exemplary embodiment of a system according to the present invention. The system comprises a chemical installation 140, in particular an industrial-scale chemical installation, and is designed for carrying out a method for the closed-loop control of a chemical process. For this purpose, the system can comprise a fieldbus 100, a control system 110 and a computer 120 or a computer system in addition to the chemical installation 140. The industrial-scale chemical installation can, for example, be an installation for the manufacture of sulfuric acid, coke, polymers, fertilizers, synthesis gas, cement, urea, ammonium nitrate or a water desalination installation. The chemical installation 140 comprises a multiplicity of subsystems 141, 142, 143 such as, for example, burners, dryers, converters or functional lines or connections. The functional lines or connections can themselves be subsystems 141, 142, 143, or can connect subsystems 141, 142, 143 to one another. The subsystems 141, 142, 143 can, moreover, be installed in the chemical installation multiple times. Each of these subsystems can comprise at least one actuator 144 as well as none, one or a plurality of sensors 145. A sensor 145 is configured to measure at least one parameter value or process data that relates to the installation 140. One or a plurality of sensors 145 can, for example, be configured to monitor a subsystem 141, 142, 143. A temperature of the subsystem 141, 142, 143 and/or of the substance to be processed can, for example, be acquired by a sensor 145. A sensor can, in addition, be configured to acquire further process data such as, for example, position data, flow rates and/or state data of the subsystem 141, 142, 143. The process data acquired by the sensor can be transferred or exchanged with a control system 110 via a fieldbus 100.

As illustrated, it is also provided that at least one setpoint value 113 is transferred to the control system 110 via an optional control station 112. The at least one setpoint value can be transferred to the control system 110 through user input, through the control system, or by calling up stored tables or values from databases.

At least a subset of the process data 123 is transferred from the control system 110 to a computer system 120 (see the arrow from 111 to 121).

As illustrated, it can be provided that the control system 110 contains a server 111, and the computer system 120 contains a client 121, wherein the server 111 and the client 121 are configured in such a way that the client 121 can perform read access to the server 111, for example by means of a request-response protocol, so that the subset of the process data is transferred from the server 111 to the client 121. It is also conceivable that the client 121 is designed as the master and that the server 111 is designed as the slave. The control system 110 can have a computer interface, for example a hardware interface such as PCI bus, AGP, SCSI, USB, FireWire and EIA-232 or Bluetooth, IrDA, or WLAN for connection of the computer system 120, via which a direct communication connection can be established between the control system 110 and the computer system 120, and at least the transfer of the subset of the process data 123 and the transfer of the manipulated variable takes place via the direct communication connection.

As illustrated, the computer system 120 comprises at least one simulation program 128 for a stationary and/or dynamic process simulation of the chemical process, a closed-loop control program 129 for the implementation of a closed-loop controller for the chemical process, and a memory 122, e.g. a working memory for storing simulated state variables 124.

The cyclically repeated calculation of the simulated state variables of the chemical process by the simulation program 128 from the subset of the process data 123 and the storage of the simulated state variables 124 in the memory 122 takes place in the computer system 120. The simulation program 128 can, as illustrated, comprise a plurality of subsystem program modules (TS 1, TS2, . . . , TS N) 141A, 142A, 143A, each of which is configured for simulation of a subsystem (subsystem 1, subsystem 2, subsystem N) 141; 142; 143 of the chemical installation 140. The subsystem program module (TS 1) 141A is configured in this exemplary embodiment in such a way that it simulates the subsystem 1 (141). The subsystem program module (TS 2) 142A is configured in this exemplary embodiment in such a way that it simulates the subsystem 2 (142), and the subsystem program module, and the subsystem program module (TS N) 143A is configured in this exemplary embodiment in such a way that it simulates the subsystem N (143). The further subsystem program module (TS N+1) 144A is configured in such a way that it switches or controls the individual subsystem program modules (in this case 141A to 143A). It can be provided here that the updating frequency of the program modules 141A, 142A, 143A is configured depending on the dynamic behavior of the respectively assigned subsystem 141; 142; 143, and the individual program modules 141A, 142A, 143A each calculate one or a plurality of the simulated state variables and store them in the memory 122 at the respective updating frequency.

At the same time and/or with a temporal offset, at least one setpoint value of a control variable of the chemical process is transferred to the closed-loop control program 129, wherein a multiplicity of setpoint values are often specified for a chemical installation. At least one subset of the simulated state variables 124 can be read from the memory 122 for input into the closed-loop control program 129. By processing the state variables 124 that have been read from the memory 122, the closed-loop control program 129 thereupon ascertains a manipulated variable for achieving the setpoint value 113. It is to be noted that, of course, a plurality of manipulated variables for achieving a plurality of setpoint values 113 can also be ascertained by the closed-loop control program 129, although only one manipulated variable is illustrated here for reasons of clear illustration.

The calculated manipulated variable is thereupon transferred to the control system 110. As described above, it can be provided that the control system 110 contains a server 111 and that the computer system 120 contains a client 121. For the transfer of the calculated manipulated variable to the control system 110 (see the arrow from 121 to 111), the server 111 and the client 121 can be configured in such a way that the client 121 can perform write access to the server 111 of the control system 110. The client 121 can here be configured as the master and the server 111 as the slave.

The control system 110 can furthermore transfer the calculated manipulated variable via the fieldbus 110 to an actuator 114 of a subsystem (represented here by way of example for subsystem 142, wherein each subsystem can comprise one or a plurality of actuators), wherein the actuator 144 can set the subsystem in accordance with the calculated manipulated variable.

As also illustrated in FIG. 1, the computer system 120 can contain a machine-learning module 130. The machine-learning module 130 can be a supervised machine-learning module. To train the machine-learning module 130, sets of training data 125 that contain at least the subset of the simulated state variables 124, and the manipulated variables calculated from them by the closed-loop control program 129, can be used. The sets of training data 125 can here contain the response of the chemical installation 140 to the manipulated variable that is contained in the process data 123.

The mode of operation of the chemical installation with the system for the closed-loop control of a chemical process carried out in an industrial-scale chemical installation is described in more detail below by means of the exemplary embodiment of the method according to the invention shown in FIG. 2.

Figure 2:
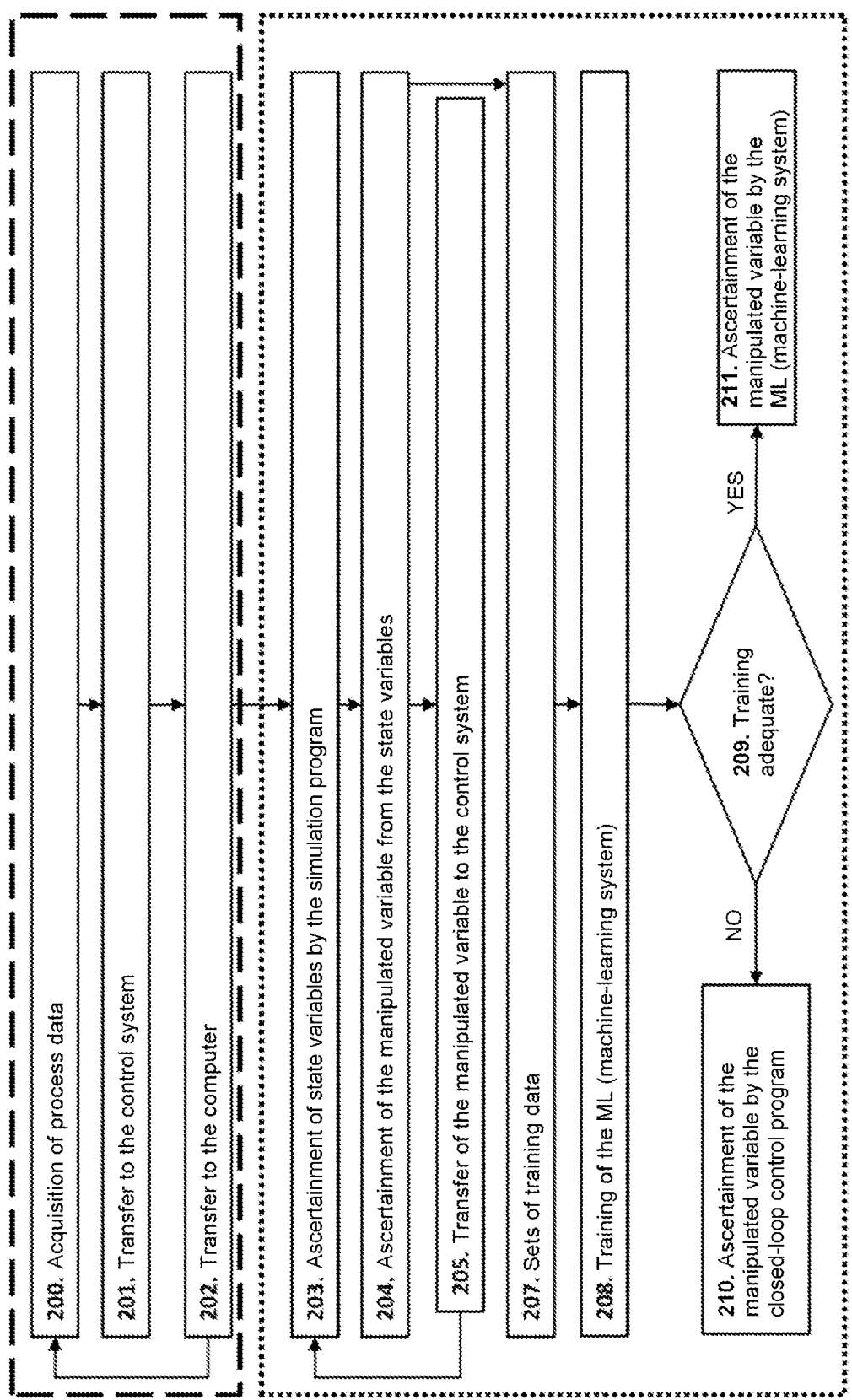
FIG. 2 is a schematic view of an example method involving acquiring process data, transferring the process data to a computer, ascertaining state variables and manipulated variables, transferring the manipulated variables to the control system, and ascertaining the manipulated variables from the state variables for the training of the machine-learning module.

The sequence of the process is represented in two process blocks (dashed process block, dotted process block) to make FIG. 2 easier to understand. The division of the process into two process blocks is made (as illustrated) at the location of the exchange of data between the server of the control system and the client of the computer system. Both processes can be operated both asynchronously and synchronously with respect to one another.

In the upper process block (dashed block), the process data is acquired in a first step 200. This can be done by means of sensors mounted in the chemical installation. In a next step 201, the process data are transferred to the control system, wherein the control system can comprise a server, and the transfer of the data to the computer 202, wherein the computer can comprise a client, takes place in a further step. The arrow from step 202 to step 200 is here intended to reflect the fact that data can also be transferred back from the computer to the subsystems of the chemical installation (where the process data is generated), and the steps 200, 201, 202 form a process that can be executed repeatedly.

In the lower process block (dotted block), the state variables are ascertained by the simulation program in step 203. The ascertainment of the manipulated variable from the state variables that are transferred to the control system (see step 205) then takes place in step 204. The control system thereupon transfers the manipulated variable-after confirmation by the user, if relevant-via the control station and via the fieldbus to the actuator. The arrow from step 205 to step 203 illustrates the fact that the steps 203, 204, 205 form a process that can be executed repeatedly. In addition to the above-described step 205, the state variables ascertained (step 204) are also transferred into the sets of training data (see the arrow from step 204 to step 207) and are thereafter used for training the machine-learning module (step 208). Whether the training of the machine-learning module is sufficient for an ascertainment of the manipulated variable is ascertained in step 209. If the machine-learning module is adequately trained, the ascertainment of the manipulated variable is performed by the machine-learning module (see step 211), but is otherwise done by the closed-loop control program (see step 210).

What is claimed is:

1. A method for closed-loop control of a chemical process performed in an industrial-scale chemical installation, the method comprising:
    acquiring process data of the industrial-scale chemical installation with sensors, the industrial-scale chemical installation having at least one subsystem having the sensors;
    transferring the process data to a control system via a fieldbus;
    transferring at least a subset of the process data from the control system to a computer system, wherein the computer system comprises a simulation program for stationary and dynamic process simulation of the chemical process, a closed-loop control program for implementing a closed-loop controller for the chemical process, and a memory for storing simulated state variables;
    cyclically, repeatedly calculating the simulated state variables of the chemical process by the simulation program from the at least the subset of the process data and storing the simulated state variables in the memory;
    transferring a setpoint value of a control variable of the chemical process to the closed-loop control program;
    reading at least a subset of the simulated state variables from the memory for input into the closed-loop control program;
    ascertaining a manipulated variable to achieve the setpoint value by the closed-loop control program through processing the simulated state variables that have been read from the memory; and
    transferring the manipulated variable that has been ascertained to the control system,
    wherein the computer system includes a machine learning module, wherein training data sets are used to train the machine learning module, which training data sets include at least the subset of the simulated state variables and the manipulated variable calculated therefrom by the control program,
    wherein the training data sets contain the response of the chemical installation to the manipulated variable contained in the process data,
    wherein after training of the machine learning module, the control program is switched over to the machine learning module, wherein the closed-loop control program is replaced by the machine learning module, and so that the manipulated variable is determined from the read state variables by the machine learning module; entering the at least the subset of the simulated state variables into the machine-learning module to ascertain a machine-learning manipulated variable;
    combining the machine-learning manipulated variable and the manipulated variable ascertained by the closed-loop control program to ascertain a resultant manipulated variable; and
    transferring the resultant manipulated variable to the control system.

2. The method of claim 1 wherein the control system contains a server and the computer system contains a client, wherein the server and the client are configured such that
    the client has read access to the server so that the at least the subset of the process data is transferred from the server to the client, and
    the client has write access to the server to transfer the manipulated variable that has been ascertained to the control system.

3. The method of claim 2 wherein the client is configured as a master and the server is configured as a slave.

4. The method of claim 2 wherein the control system includes a computer interface for connection of the computer system, via which computer interface a communication connection between the control system and the computer system is established, wherein the transfer of the at least the subset of the process data and the transfer of the manipulated variable take place via the communication connection.

5. The method of claim 1 comprising training the machine-learning module with additional sets of training data that are generated from further operation of the industrial-scale chemical installation by the closed-loop controller by way of the machine-learning module.

6. The method of claim 1 wherein the simulation program comprises program modules each of which is configured for simulation of the at least one subsystem of the industrial-scale chemical installation, wherein an updating frequency of the program modules is configured based on dynamic behavior of the at least one subsystem, wherein each of the program modules calculates and stores one or more simulated state variables in the memory at the respective updating frequency.

7. The method of claim 6 comprising forming a processing block with an input and an input by each of the program modules and with a linking program for linking the processing blocks.

8. A system for closed-loop control of a chemical process performed in an industrial-scale chemical installation, wherein the system is configured to perform the method of claim 1.

9. A chemical installation with the system of claim 8.

10. The chemical installation of claim 9 configured as an installation for manufacture of sulfuric acid, coke, polymers, fertilizers, synthesis gas, cement, urea, ammonium nitrate, or water desalination.

* * * * *